United States Patent
Yaffe

(10) Patent No.: US 10,583,884 B2
(45) Date of Patent: *Mar. 10, 2020

(54) SADDLEBAG SPEAKER ASSEMBLY AND METHOD OF FORMING A SADDLEBAG SPEAKER ASSEMBLY

(71) Applicant: Paul Yaffe, Phoenix, AZ (US)

(72) Inventor: Paul Yaffe, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/173,802

(22) Filed: Oct. 29, 2018

(65) Prior Publication Data

US 2019/0127008 A1  May 2, 2019

Related U.S. Application Data

(63) Continuation of application No. 15/610,077, filed on May 31, 2017, now Pat. No. 10,112,671.

(51) Int. Cl.
| | |
|---|---|
| *B62J 9/00* | (2006.01) |
| *B62J 99/00* | (2009.01) |
| *H04R 1/02* | (2006.01) |

(52) U.S. Cl.
CPC .............. *B62J 99/00* (2013.01); *B62J 9/00* (2013.01); *H04R 1/025* (2013.01); *B62J 2099/0006* (2013.01); *H04R 1/023* (2013.01); *H04R 2499/13* (2013.01)

(58) Field of Classification Search
CPC ...... B62J 99/00; B62J 9/00; B62J 2099/0006; H04R 1/025; H04R 1/023; H04R 2499/13
USPC .......................................... 381/86, 336, 386
See application file for complete search history.

(56) References Cited

U.S. PATENT DOCUMENTS

| | | | | |
|---|---|---|---|---|
| 5,400,407 A | * | 3/1995 | Cassity | H04R 1/025 |
| | | | | 181/150 |
| 7,742,615 B1 | * | 6/2010 | Lopez | H04R 1/028 |
| | | | | 381/386 |
| D625,708 S | * | 10/2010 | Files | D12/114 |
| 8,638,970 B2 | * | 1/2014 | Burton | H04R 1/1016 |
| | | | | 181/135 |

* cited by examiner

*Primary Examiner* — Vivian C Chin
*Assistant Examiner* — Ubachukwu A Odunukwe
(74) *Attorney, Agent, or Firm* — Ice Miller LLP

(57) ABSTRACT

A saddlebag speaker assembly for housing a speaker within a saddlebag and a method of forming a saddlebag speaker assembly are provided. The assembly includes a saddlebag lid opening cover configured to cover the saddlebag lid opening and couple to the saddlebag lid and the speaker.

12 Claims, 7 Drawing Sheets

SADDLEBAG SPEAKER ASSEMBLY AND METHOD OF FORMING A SADDLEBAG SPEAKER ASSEMBLY

RELATED APPLICATION DATA

This application is a continuation of U.S. application Ser. No. 15/610,077, filed May 31, 2017, now U.S. Pat. No. 10,112,671, which is hereby incorporated in its entirety herein by reference.

BACKGROUND

Modern touring motorcycles often have panniers or saddlebags mounted on either side of the rear of the motorcycle, typically below and behind the rider, to facilitate long or short term storage on the motorcycle. While soft saddlebags are typically made from textile or leather, hard saddlebags are commonly formed from a polymer or composite material, such as ABS. The contents located at an interior space of a hard saddlebag may be accessed by lifting or otherwise opening a saddlebag lid. The lid and the lower portion of a hard saddlebag are typically connected by a hinge mechanism at one side of the lid and a latch mechanism at the opposite side.

Modern touring motorcycles also often include speakers to provide music or other audio for the rider. Such speakers may be located near or in a front fairing or integrally formed into the saddlebag lid. However, many conventional saddlebag speaker assemblies and methods of providing a speaker at the location of the saddlebag lid of a touring motorcycle require replacing the entire saddlebag lid and/or saddlebag. Such replacement often results in significant waste, substantial cost, considerable labor and paint work, and an undesirable appearance and/or operation of the saddlebag and/or saddlebag lid.

Therefore, there exists a need for a saddlebag speaker assembly and method of forming a saddlebag speaker assembly that provides a speaker in a saddlebag assembly without incurring unnecessary waste or expense. There likewise exists a need for a saddlebag speaker assembly and method of forming a saddlebag speaker assembly that retains the manufacturer's original equipment saddlebag lid. Further, there exists a need for a saddlebag speaker assembly and method of forming a saddlebag speaker assembly that results in a saddlebag and/or saddlebag lid having an improved appearance and operation.

SUMMARY

In accordance with an embodiment of the present disclosure, a saddlebag speaker assembly for housing a speaker within a saddlebag is provided. The assembly includes a saddlebag lid configured to cooperate with a saddlebag base to form a saddlebag interior space, the saddlebag lid including a saddlebag lid upper portion and a saddlebag lid opening through the saddlebag lid upper portion, a saddlebag lid opening cover covering the saddlebag lid opening, and a speaker coupled to the saddlebag lid at the saddlebag lid opening and having a speaker face comprising a speaker face area greater than the saddlebag lid opening.

In accordance with an embodiment of the present disclosure, a saddlebag speaker assembly for housing a speaker within a saddlebag is provided. The assembly includes a speaker adapter having a speaker adapter first end configured to be coupled to a saddlebag lid at a saddlebag lid opening and having a first end opening area, the speaker adapter further having a speaker adapter second end configured to be coupled to a speaker and having a second end opening area greater than the first end opening area, and a saddlebag lid opening cover configured to cover the saddlebag lid opening and couple to the saddlebag lid.

In accordance with an embodiment of the present disclosure, a method of forming a saddlebag speaker assembly to house a speaker within a saddlebag is provided. The method includes providing a saddlebag lid having a saddlebag lid upper portion, providing a speaker adapter having a speaker adapter first end and a speaker adapter second end opposite the speaker adapter first end, forming a saddlebag lid opening through the saddlebag lid upper portion of the saddlebag lid, coupling the speaker adapter to the saddlebag lid such that the speaker adapter first end is positioned proximate to the saddlebag lid opening and the speaker adapter second end is positioned distal to the saddlebag lid opening, and coupling a saddlebag lid opening cover to the saddlebag lid upper portion over the saddlebag lid opening.

BRIEF DESCRIPTION OF THE FIGURES

While the specification concludes with claims particularly pointing out and distinctly claiming the present disclosure, it is believed that the present disclosure will be better understood from the following description in conjunction with the accompanying Drawing Figures, in which like reference numerals identify like elements, and wherein:

DETAILED DESCRIPTION

In the following detailed description of the preferred embodiment, reference is made to the accompanying drawings that form a part hereof, and in which is shown by way of illustration, and not by way of limitation, a specific preferred embodiment in which the disclosure may be practiced. It is to be understood that other embodiments may be utilized and that changes may be made without departing from the spirit and scope of the present disclosure.

Figure 1:
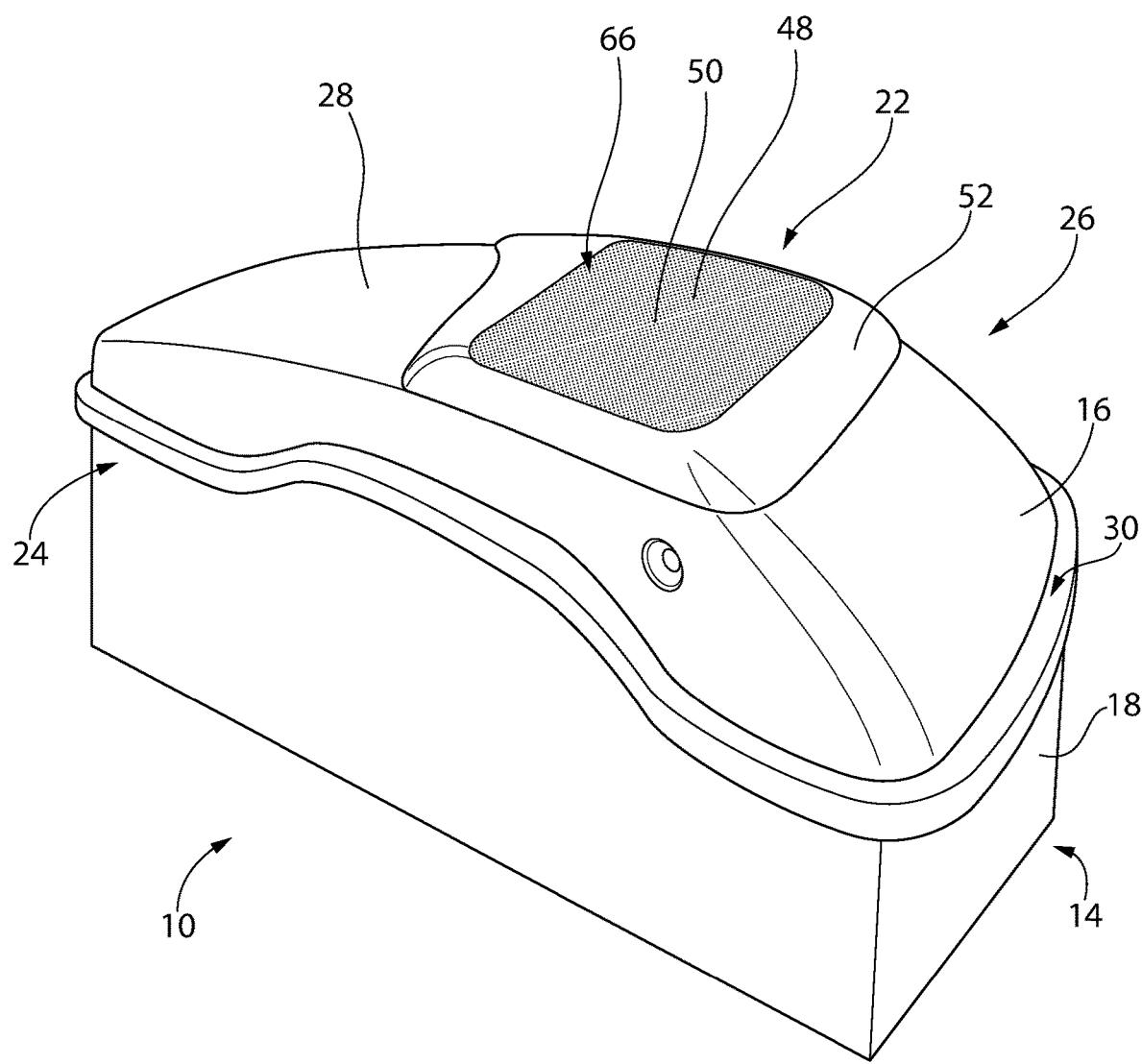
FIG. 1 is a front perspective view of a saddlebag speaker assembly in accordance with aspects of the present disclosure.
Figure 2:
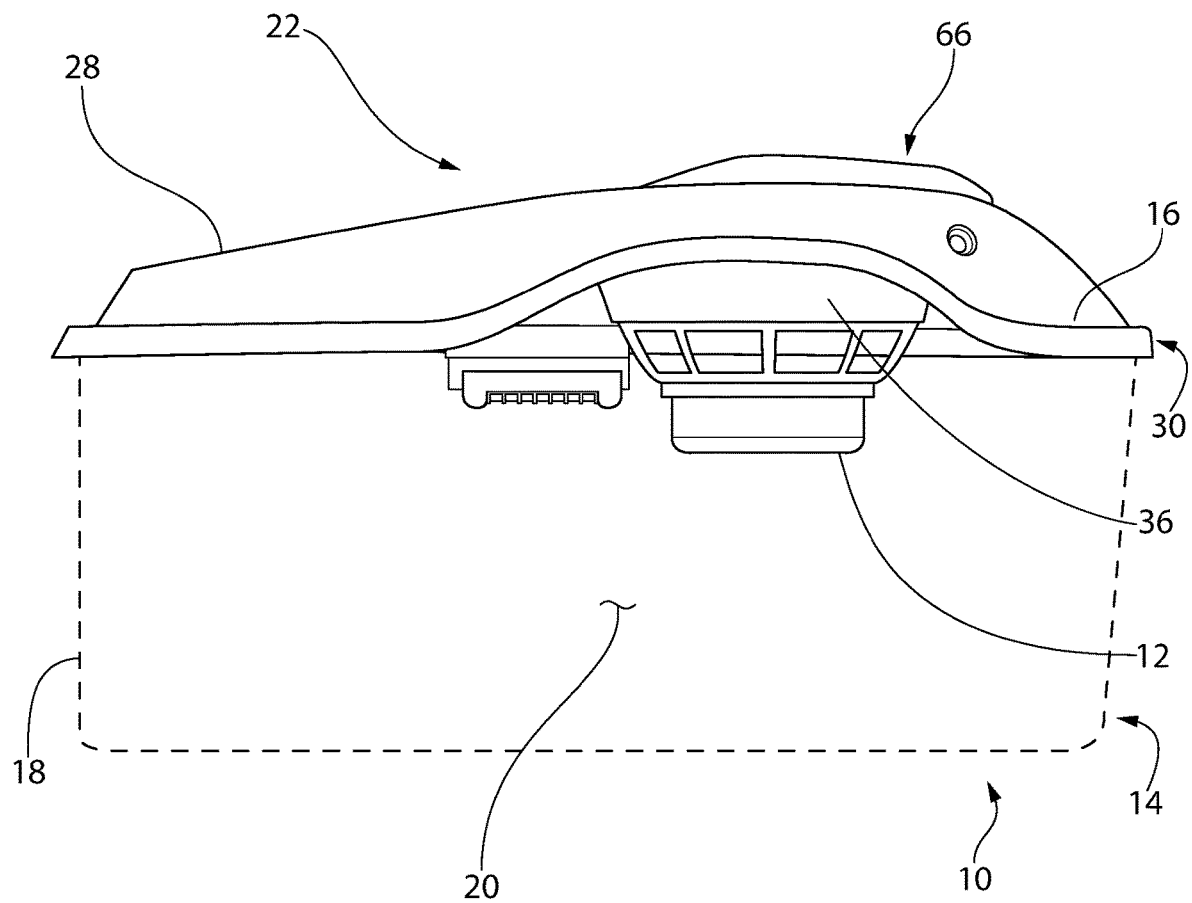
FIG. 2 is a right side perspective view of a saddlebag speaker assembly in accordance with aspects of the present disclosure.

Reference is now made to FIGS. 1 and 2, which show an embodiment of the present disclosure featuring a saddlebag speaker assembly 10 for housing a speaker 12 within a saddlebag 14. The speaker 12 in the illustrated embodiment is a 6"×9" audio speaker, but one having ordinary skill in the art recognizes the variety of speaker sizes, geometries, and configurations, and any speaker having such variations forms part of the present disclosure. As will be appreciated by the present disclosure, multiple speakers and/or speaker sizes may be accommodated with the saddlebag speaker assembly 10 of the present disclosure. As one non-limiting example, the saddlebag speaker assembly 10 and methods described herein will provide the ability to form one or more openings to accommodate one or more speakers of varying sizes, geometries, orientations.

The saddlebag 14 of particular embodiments includes a saddlebag lid 16 and a saddlebag base 18 disposed below the saddlebag lid 16. The saddlebag lid 16 of the illustrated embodiments is configured to cooperate with the saddlebag base 18 to enclose or otherwise form an interior space 20 of the saddlebag 14. The saddlebag 14 illustrated in FIGS. 1 and 2 is configured to be positioned on the left side of a motorcycle or other vehicle (not shown). One of ordinary skill in the art will recognize that the saddlebag 14 of the embodiments described herein may be constructed or configured for positioning and operation on the right side of the motorcycle or other vehicle in one or more additional embodiments not illustrated.

Figure 3:
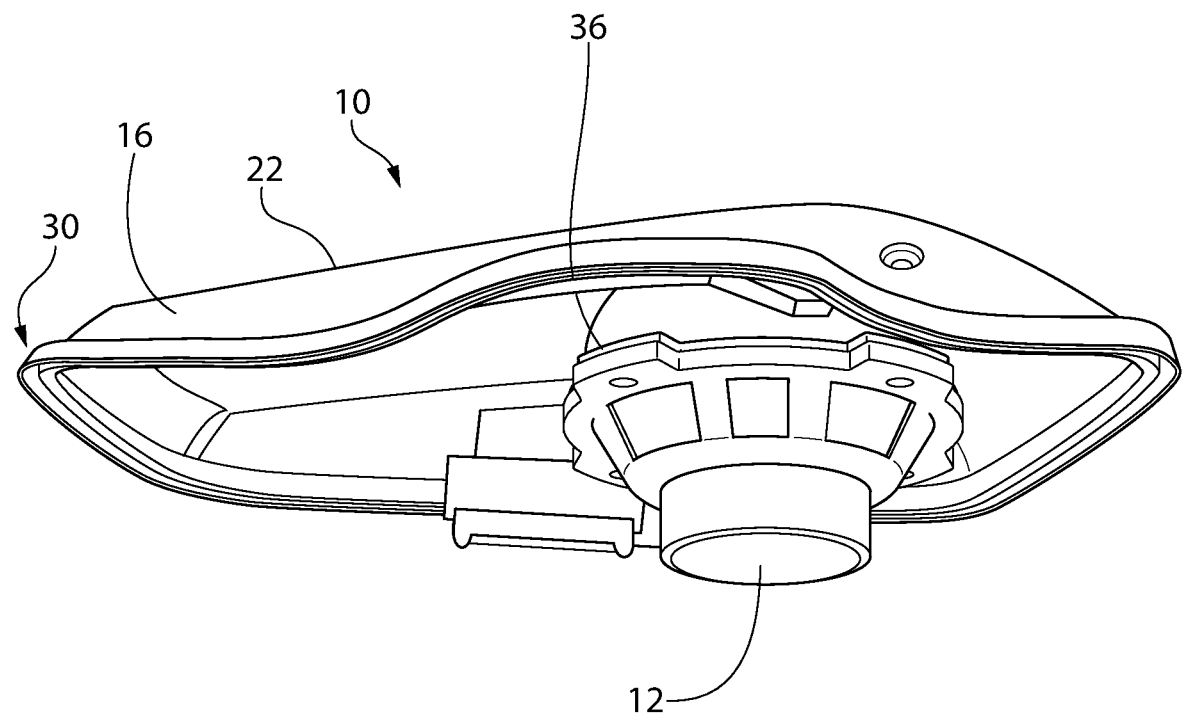
FIG. 3 is a right side perspective view of a saddlebag speaker assembly in accordance with aspects of the present disclosure.

Referring now to FIGS. 1-3, the saddlebag lid 16 includes a saddlebag lid upper portion 22, a saddlebag lid inner portion 24, and a saddlebag lid outer portion 26, as illustrated in FIG. 1. The saddlebag lid upper portion 22 includes an upper portion area 28 generally defined by the upper surface of the saddlebag lid upper portion 22, as illustrated in FIGS. 1 and 2. The saddlebag lid 16 further includes a saddlebag lid lower portion 30. The saddlebag lid lower portion 30 of the embodiment illustrated in FIGS. 1-3, and further illustrated in FIG. 5, includes a lower portion area 32 that is generally larger, wider, or otherwise greater in size than the upper portion area 28.

Figure 4:
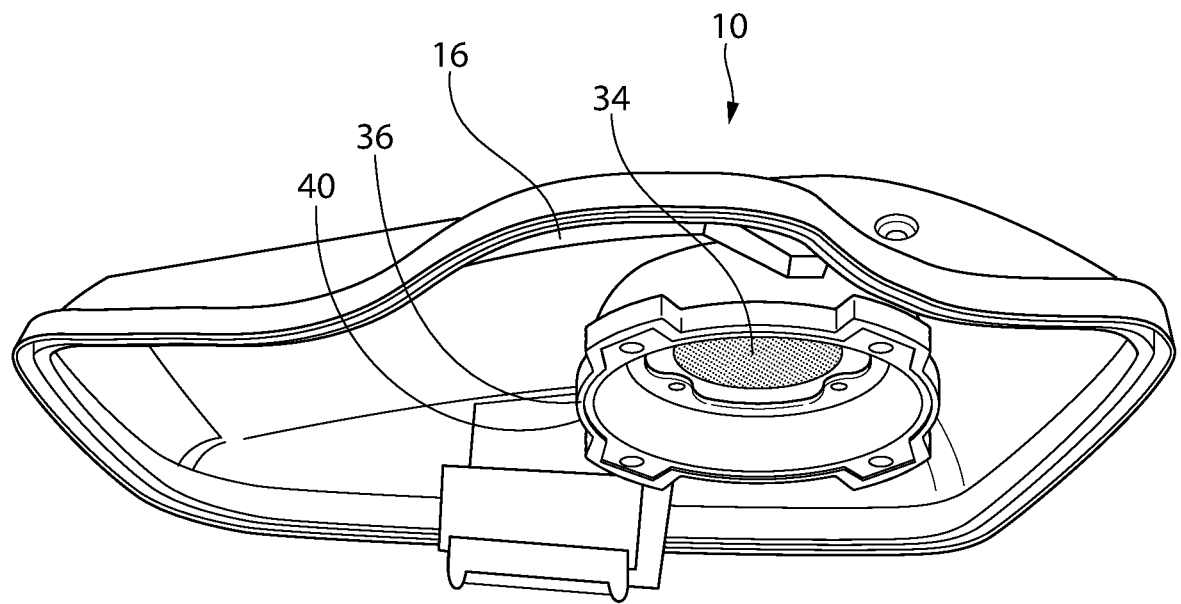
FIG. 4 is a perspective view of a saddlebag speaker assembly in accordance with aspects of the present disclosure.
Figure 5:
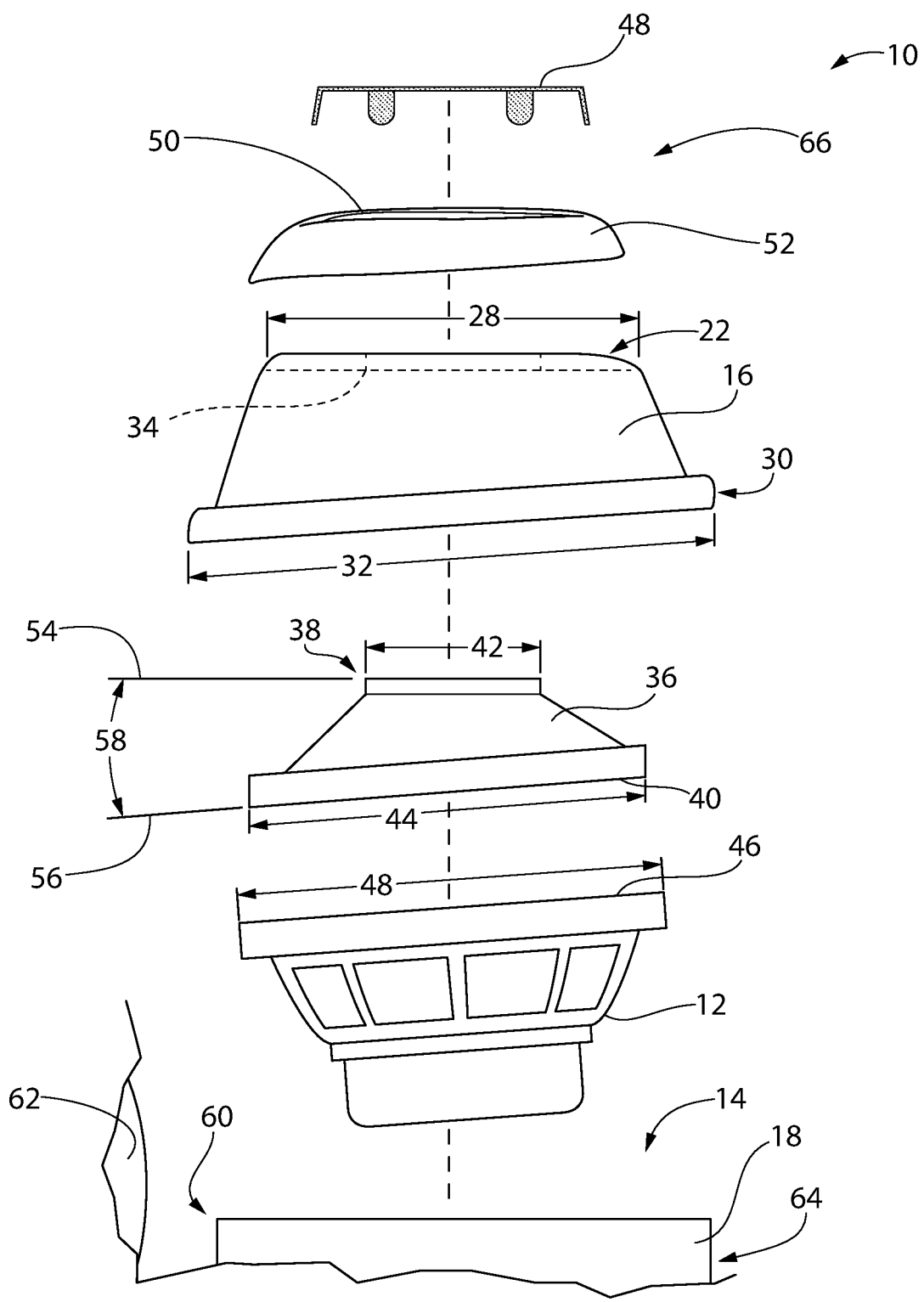
FIG. 5 is an exploded front elevation view of a saddlebag speaker assembly in accordance with aspects of the present disclosure.
Figure 6:
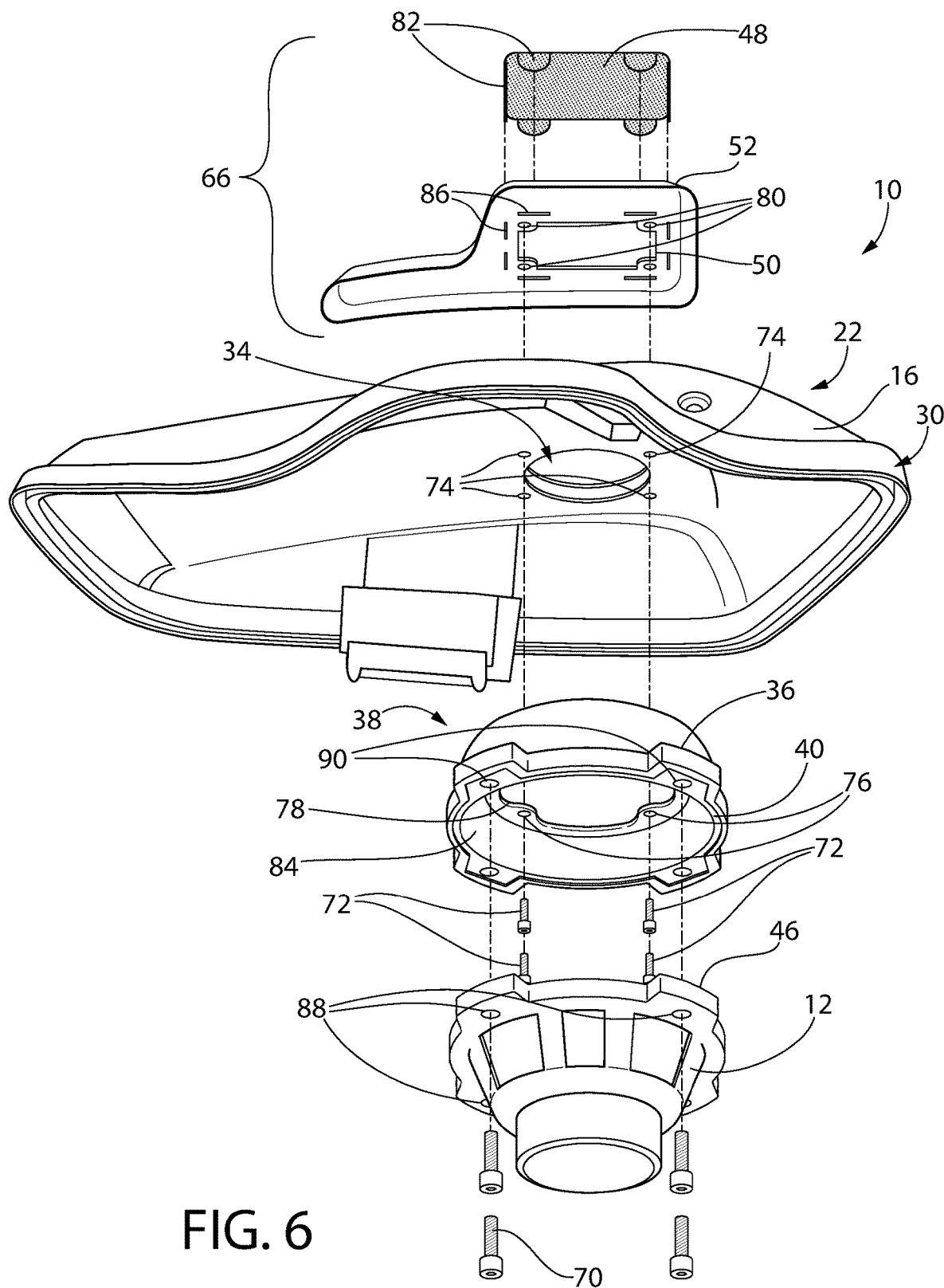
FIG. 6 is an exploded perspective view of a saddlebag speaker assembly in accordance with aspects of the present disclosure.

Referring now to FIGS. 4-6, the saddlebag lid 16 further includes a saddlebag lid opening 34, as illustrated in FIGS. 4 and 6, through the saddlebag lid upper portion 22. The saddlebag speaker assembly 10 further includes a speaker adapter 36, as illustrated in FIGS. 4-6. The speaker adapter 36 includes a speaker adapter first end 38 and a speaker adapter second end 40 opposite the speaker adapter first end 38. The speaker adapter first end 38 is configured to be coupled to the saddlebag lid 16 at, adjacent to, and/or proximate to the saddlebag lid opening 34 in an embodiment. The speaker adapter second end 40 is configured to be coupled to the speaker 12 in an embodiment. The speaker adapter first end 38 includes a first end opening area 42, and the speaker adapter second end 40 includes a second end opening area 44. The second end opening area 44 is greater than the first end opening area 42 in an embodiment.

FIG. 5 is an exploded view of the saddlebag speaker assembly 10 in accordance with particular embodiments. As illustrated in FIG. 5, the speaker 12 of an embodiment includes a speaker face 46 having a speaker face area 48 that is substantially equal to the second end opening area 44. In an embodiment, the speaker face area 48 is substantially congruous with the second end opening area 44. In an embodiment, the speaker face area 48 releasably interfaces with the second end opening area 44. The speaker 12 is disposed within the interior space 20 such that speaker face 46 faces toward the saddlebag lid opening 34. As best illustrated in FIG. 2, the speaker 12 of the saddlebag speaker assembly 10 of one embodiment is configured to be positioned at least partially below the saddlebag lid 16. Further, in an additional embodiment, the speaker face 46 is substantially horizontally aligned with the saddlebag lid lower portion 30.

Referring to FIGS. 1, 5, and 6, the saddlebag speaker assembly 10 of an embodiment further includes a saddlebag lid opening cover 66 configured to be coupled to the saddlebag lid 16 and cover the saddlebag lid opening 34. The saddlebag lid opening cover 66 includes a grille 48 in an embodiment. The grille 48 includes a grille area 50, illustrated greater or larger than the first end opening area 42 of the speaker adapter first end 38 in an embodiment and greater or larger than the saddlebag lid opening 34 in an embodiment. The saddlebag lid opening cover 66 further includes a grille housing 52 in the embodiment illustrated in FIGS. 1, 5, and 6. As illustrated in FIG. 5, the grille housing 52 is larger than the saddlebag lid opening 34 and the first end opening 46 in one or more embodiments.

Referring now to FIG. 6, the speaker 12 is coupled to the speaker adapter 36 using one or more speaker fasteners 70 through one or more speaker outer apertures 88 and/or one or more speaker adapter outer apertures 90. The saddlebag lid opening cover 66 is coupled to the saddlebag lid 16 using one or more cover fasteners 72. Additionally, the speaker adapter 36 is coupled to the saddlebag lid 16 using the one or more cover fasteners 72, but may be coupled to the saddlebag lid 16 with separate speaker adapter fasteners not illustrated. The saddlebag lid 16 includes one or more lid apertures 74 configured to accept one or more fasteners and/or to attach the saddlebag lid 16 to the speaker 12, the speaker adapter 36, and/or the saddlebag lid opening cover 66. The lid apertures 74 encircle or surround the saddlebag lid opening 34 in the embodiment illustrated in FIG. 6. The speaker adapter 36 includes one or more speaker adapter apertures 76 configured to accept one or more fasteners and/or to attach the speaker adapter 36 to the saddlebag lid 16. The one or more speaker adapter apertures 76 surround and/or encircle a speaker adapter opening 78 inside of a speaker adapter wall 84. The grille housing 52 includes one or more grille housing apertures 80 configured to accept one or more fasteners and/or to attach the grille housing 52 to the saddlebag lid 16. Further, the grille 48 includes one or more tabs 82 configured to attach the grille 48 to slot(s) 86 in the grille housing 52, but may include, fasteners, apertures, and/or another attachment structure to perform this function of attachment. The one or more speaker fasteners 70, the one or more cover fasteners 72, and/or the one or more speaker adapter fasteners extend through the saddlebag lid 16 in one or more embodiments. In an embodiment, the speaker 12, the speaker adapter 36, and the saddlebag lid opening cover 66 are attached such that the saddlebag lid 16 is disposed between the saddlebag lid opening cover 66 and the speaker adapter 36. One having ordinary skill in the art will appreciate that any number of fasteners may be utilized for attachment of the above components and/or one or more of the fasteners identified above may be utilized to attach multiple components.

As best shown in FIG. 5, the speaker adapter first end 38 is aligned with a first plane 54 and the speaker adapter second end 40 is aligned with a second plane 56 that forms a speaker angle 58 with the first plane 54. In embodiment not shown, the first plane 54 and the second plane 56 are parallel such that no speaker angle 58 is formed between the speaker adapter first end 38 and the speaker adapter second end 40. The embodiment of FIG. 5 shows the saddlebag 14 having an inner end 60 that would be proximate a rider location 62 when the saddlebag 14 is mounted to a motorcycle or other vehicle (not shown). The saddlebag 14 further includes an outer end 64 distal the rider location 62. The speaker angle 58 is configured to position the speaker 12 such that the speaker 12 faces at least partially toward the rider location 62.

Figure 7:
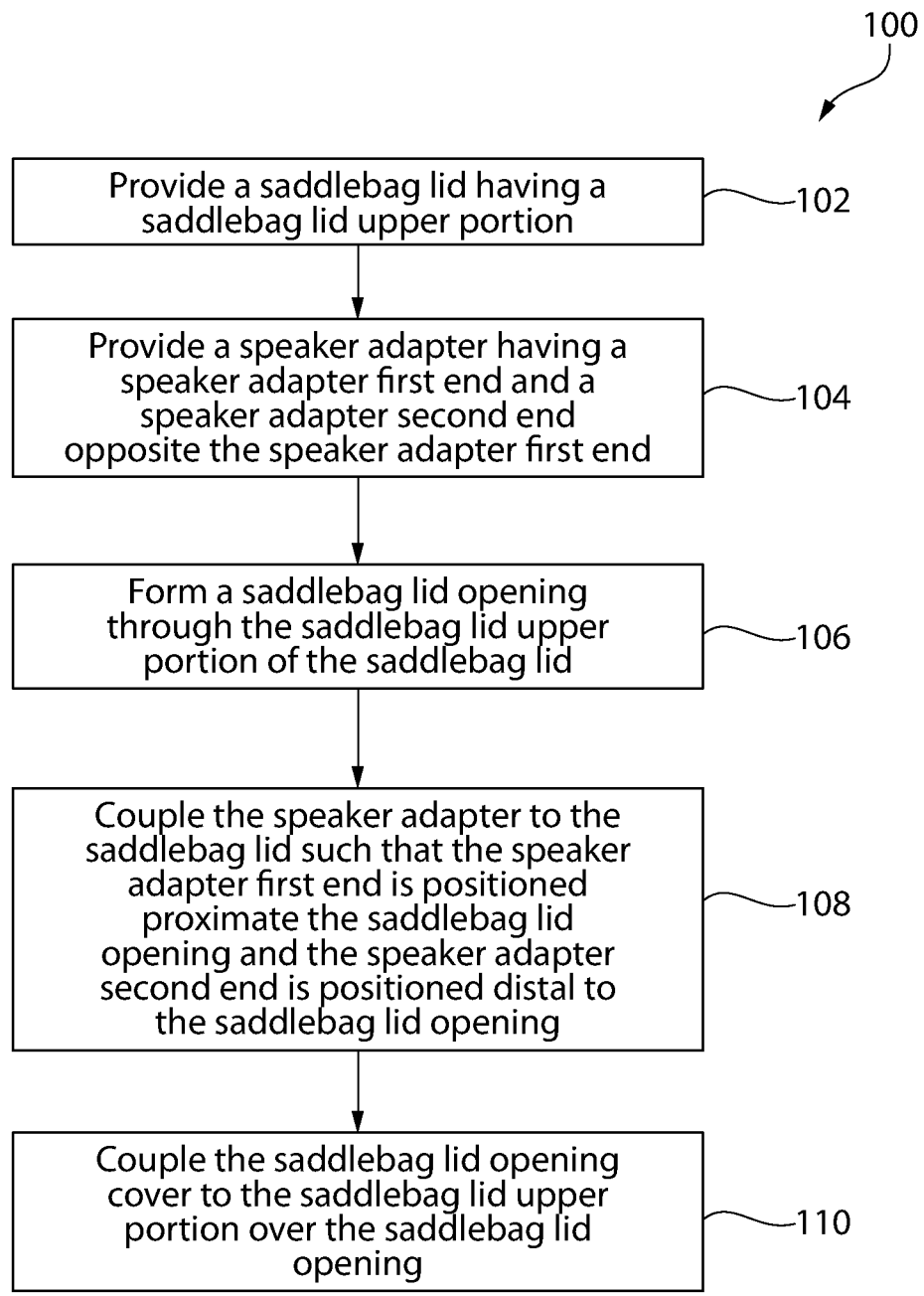
FIG. 7 illustrates a method of forming a saddlebag speaker assembly in accordance with aspects of the present disclosure.

Referring now to FIG. 7, the present disclosure further includes a method 100 of forming the saddlebag speaker assembly 10 to house the speaker 12 within the saddlebag 14. The method 100 includes providing, at step 102, the saddlebag lid 16 having the saddlebag lid upper portion 22. The method 100 further includes providing, at step 104, the speaker adapter 36 having the speaker adapter first end 38 and the speaker adapter second end 40 opposite the speaker adapter first end 38. The method 100 further includes forming, at step 106, the saddlebag lid opening 34 through the saddlebag lid upper portion 22 of the saddlebag lid 16. The method 100 further includes coupling, at step 108, the speaker adapter 36 to the saddlebag lid 16 such that the speaker adapter first end 38 is positioned proximate to the saddlebag lid opening 34 and the speaker adapter second end 40 is positioned distal to the saddlebag lid opening 34. The method 100 further includes coupling, at step 110, the saddlebag lid opening cover 66 to the saddlebag lid upper portion 22 over the saddlebag lid opening 34.

In additional embodiments, the method 100 may further include coupling the speaker 12 to the speaker adapter second end 40 of the speaker adapter 36. Coupling the speaker 12 to the speaker adapter second end 40 of the speaker adapter 36 may include positioning, in particular embodiments, the speaker 12 such that the speaker 12 faces at least partially toward the inner end 60 of the saddlebag 14 proximate the rider location 62. In an embodiment, coupling the saddlebag lid opening cover 66 to the saddlebag lid upper portion 22 includes coupling the grille housing 52 to the saddlebag lid upper portion 22 of the saddlebag lid 16. In an embodiment, coupling the saddlebag lid opening cover 66 to the saddlebag lid upper portion 22 further includes coupling the grille 48 to the grille housing 52 such that the grille 48 covers the saddlebag lid opening 34. The steps of the method 100 of forming the saddlebag speaker assembly 10 described herein may be executed in any order.

Among other advantages, the saddlebag speaker assembly 10 and method 100 embodiments described in the present disclosure allow the incorporation of the speaker 12 into the saddlebag 14 without incurring unnecessary waste or expense. Further, the assembly 10 and method 100 according the present embodiments provide the speaker 12 housed in the saddlebag 14 such that the resulting saddlebag 14 and/or saddlebag lid 16 have an improved appearance and operation. For example, the saddlebag 14 and/or saddlebag lid 16 provided with a vehicle, such as a motorcycle, may be utilized with the speaker adapter 36 and/or the saddlebag lid opening cover 66 described herein to form the saddlebag speaker assembly 10 without requiring a redesigned saddlebag or saddlebag lid, or extensive modification and painting of an original equipment saddlebag lid, to accommodate the size, geometry, or orientation of a speaker housed in the saddlebag 14. Additionally, the saddlebag speaker assembly 10 and method 100 described herein result in the speaker 12 being positioned so that it faces the vehicle operator or rider. Such a positioning improves the transmission of sound from the speaker 12 and reduces unintended noise pollution from sound from the speaker 12 being directed away from the vehicle operator or rider. The saddlebag speaker assembly 10 and method 100 described herein are also sufficiently easy to install for amateur hobbyists and individual motorcycle owner-operators. The saddlebag lid opening cover 66 of the saddlebag speaker assembly 10 and method 100 described herein allows the saddlebag lid opening 34 to be cut, bored, drilled, or otherwise formed with minimal precision as the saddlebag lid opening cover 66 and the method 100 at least partially conceals the edges of the saddlebag lid opening 34.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

I claim:

1. A saddlebag speaker assembly for housing a speaker within a saddlebag having a first saddlebag end and a second saddlebag end, the assembly comprising:
    a saddlebag container lid having an upper surface having a speaker opening;
    a cover covering said speaker opening;
    a speaker adapter including a speaker adapter first end configured to be coupled to the saddlebag lid at said opening and having a first opening area, said speaker adapter further including a speaker adapter second end having a second opening area, wherein the second opening area is greater than the first opening area; and
    a speaker coupled to the speaker adapter second end and having a speaker face, and comprising a speaker face area greater than the saddlebag lid opening, and wherein the speaker face is maintained at an angle to the upper surface with respect to one of said saddlebag ends.

2. The assembly of claim 1, wherein the second end opening area is substantially equal to the speaker face area.

3. The assembly of claim 1, wherein the saddlebag is adapted to be attached to a motorcycle having a rider location, such that said first saddlebag end is an inner end adapted to be attached adjacent proximate said rider location, and said second saddlebag end is an outer end distal said rider location, the speaker angle configured to position the speaker such that the speaker faces toward said rider location.

4. The assembly of claim 1, wherein said first saddlebag end is an inner end.

5. The assembly of claim 1, wherein said first saddlebag end is an outer end.

6. A saddlebag speaker adapter for housing a speaker within a saddlebag having a saddlebag lid, said saddlebag lid having an opening in its upper surface, the upper surface defining an upper surface plane, and the saddlebag speaker adapter comprising:
    a speaker adapter having a first and second end, said first end configured to be coupled to a saddlebag lid at a saddlebag lid opening and having a first end opening area, and said second end configured to be coupled to a speaker having a speaker face defining a speaker face plane, such that the speaker face points in the direction of the speaker adapter first end and having a second end opening area greater than the first end opening area; and wherein the speaker adapter is adapted to couple a speaker to the saddlebag lid such that it maintains the speaker face plane at an angle to the upper surface plane.

7. The saddlebag speaker adapter of claim 6, wherein the speaker angle positions the speaker such that the speaker faces toward an inner end of the saddlebag proximate a rider location.

8. A method of forming a saddlebag speaker assembly to house a speaker within a saddlebag, the method comprising:

providing a saddlebag lid having a saddlebag lid upper portion having an upper surface;

providing a speaker adapter with a speaker adapter first end and a speaker adapter second end, the speaker adapter first end having a first open area and the speaker adapter second end having a second open area, where the second open area is greater than the first open area and the speaker adapter first end is configured relative to the speaker adapter second end to maintain a speaker face at an angle to the upper surface once attached therebetween;

forming a saddlebag lid opening through the saddlebag lid upper portion of the saddlebag lid;

coupling the speaker adapter to the saddlebag lid such that the speaker adapter first end is positioned proximate to the saddlebag lid opening and the speaker adapter second end is positioned distal to the saddlebag lid opening and capable of being coupled to a speaker such that a speaker face points in the direction of the speaker adapter first end, and maintains the speaker face at an angle to the upper surface; and coupling a saddlebag lid opening cover to the saddlebag lid upper portion over the saddlebag lid opening.

9. The method of claim 8, further comprising coupling the speaker to the speaker adapter second end of the speaker adapter.

10. The method of claim 9, wherein, coupling the speaker to the speaker adapter second end of the speaker adapter includes positioning the speaker such that the speaker faces toward an inner end of the saddlebag proximate a rider location.

11. The method of claim 8, wherein coupling the saddlebag lid opening cover to the saddlebag lid upper portion includes coupling a grille housing to the saddlebag lid upper portion of the saddlebag lid.

12. The method of claim 11, wherein coupling the saddlebag lid opening cover to the saddlebag lid upper portion further includes coupling a grille to the grille housing such that the grille covers the saddlebag lid opening.

* * * * *